United States Patent [19]
Sato et al.

[11] Patent Number: 5,439,434
[45] Date of Patent: Aug. 8, 1995

[54] AUTOMATIC TOOL EXCHANGER

[75] Inventors: Kyuichi Sato; Yukio Tamura, both of Niigata, Japan

[73] Assignee: Niigata Engineering Co., Ltd., Tokyo, Japan

[21] Appl. No.: 238,891

[22] Filed: May 6, 1994

[30] Foreign Application Priority Data

May 7, 1993 [JP] Japan .................... 5-107088

[51] Int. Cl.6 .............................. B23Q 3/157
[52] U.S. Cl. .......................... 483/1; 483/43; 483/48; 483/52
[58] Field of Search .......... 483/42, 43, 31, 48, 483/52, 1, 902

[56] References Cited
U.S. PATENT DOCUMENTS 3,608,185 3/1971 Pfister ................... 483/42
3,619,898 11/1971 Perry et al. ............. 483/48
4,575,918 3/1986 Mattson ................. 483/43 X

FOREIGN PATENT DOCUMENTS 0657954 4/1979 U.S.S.R. ................ 483/902

Primary Examiner—Z. R. Bilinsky
Attorney, Agent, or Firm—Scully, Scott, Murphy & Presser

[57] ABSTRACT

A simple and efficient tool exchanger device is presented. The device has a pair of swing arms (8, 9), and each swing arm is provided with a set of grippers (11, 12) for holding a tool bit. The positions of the swing arms (8, 9) are separated by 90 degree so that they will not interfere with each other during the swinging motion. One driving device (2) is provided to operate both swing arms (8, 9) and operate the gripper devices (11, 12). The swing arm (8) rotates upwards to remove a used tool bit (10) from the machining shaft (21) of a machining center and the other swing arm (9) is rotated downwards to install a new tool bit (10') in the vacated machining shaft in a single simultaneous step.

16 Claims, 6 Drawing Sheets

AUTOMATIC TOOL EXCHANGER

BACKGROUND OF THE INVENTION

1. Field of the Invention

The present invention relates to a device for automatically exchanging tools between a spindle of machine tool and a tool magazine.

2. Technical Background

Productivity improvement is one of the basic requirements of a machining center. With an improvement in cutting efficiency being achieved in modern machining centers, there is a strong need for shortening the non-cutting time particularly for light alloy fabrication operations which generally require short cutting time. There is thus an important need for shortening the time required for exchanging the tools between machining steps, because such steps occupy almost 20 percent of the total machining cycle time. To date, various tool exchanger devices have been disclosed, for example, in referenced such as Japanese Utility Model, S61-42755 and JP, First Publication, S61-53182 and JP, First Publication, H5-16047.

Such a device typically performs the following steps: gripping a tool, a used bit which has completed its job, disposed in the spindle; removing the used tool from the tapered hole of the spindle; exchanging the position of the used tool disposed on a line of the extension of the spindle with another tool to be used in the same position; inserting the another tool in the spindle; and releasing the hold on the spindle so that the spindle can rotate and move into an operating position. However, such a device tries to improve the machining efficiency by speeding up the steps by using hydraulic or mechanical transmission systems.

The conventional device of this type suffered from the following problems.

(a) There is a large motion range (the path of travel made by the tool bits to be exchanged), and the improvement is limited basically by the acceleration achievable within the speed attained by the tool.

(b) For each motion of the steps, acceleration and deceleration periods are required, and a time lag is generated.

(c) Various mechanisms are required for performing the various steps, and the device becomes complex to make, thus increasing the chances of device breakdowns.

SUMMARY OF THE INVENTION

The tool exchanger device of the present invention was made to resolve the problems outlined above, and the purpose is to present a device which can be manufactured easily and able to perform exchanging of tool bits automatically and reliably.

This purpose is achieved in a device comprising: a support frame; a rotating shaft having a swing arm having a gripper device freely rotatably disposed on the support frame; another rotating shaft having another swing arm having another gripper device freely rotatably disposed on the support frame; and a driving device for operating the swing arms so as to remove one tool bit from a spindle disposed on a machining center with one gripper device of the swing arm and simultaneously installing another tool with another gripper device of the another swing arm in a vacated the spindle disposed on the machining center.

A feature of the device is that an output shaft of the driving device has a bevel gear to engage with a follower bevel gear disposed on the rotating shaft and with another follower gear disposed on the another rotating shaft.

A feature of the device is that the one rotating shaft and the another rotating shaft is separated by a 90 degree separation angle.

A modification of the device of the present invention is that the driving device for operating the swing arms is provided individually on each of the one rotating shaft and the another rotating shaft.

The device presented above has a pair of rotation shafts each of which is provided with a swing arm having a set of gripper devices. The swing arms can be rotated freely without interfering with each other so that the tool used for machining disposed on the spindle of the machine center is removed by one set of grippers disposed on one swing arm and simultaneously the other set of grippers disposed on the other swing arm installed a new tool on the vacated spindle of the machining center.

The above presented action of the device is made possible by disposing a bevel gear on the output shaft of the driving device so as the drive the two rotation shaft by means of a follower bevel gear disposed on each of the rotation shafts. Such an arrangement of the driving mechanism produces simple and durable device which does not generate errors and breakdowns thus providing reliable machining operations.

A modification of the device is also presented such that the driving device is provided individually on each of the rotation shafts of the device of the present invention. The device of such a construction is advantages compared with the conventional devices for automatic exchanging of tool bits because the steps required in the conventional devices: removing the tool bit from the spindle; switching the used tool with a new tool bit; installing the new tool bit in the spindle of the machining center; are eliminated and replaced with one step of simultaneously removing the used tool bit from the spindle and installing the new tool and in the spindle of the machining center. Therefore, the entire operation of exchanging the tool bits is carried out efficiently to improve the machining operation of the machining center.

PREFERRED EMBODIMENT OF THE INVENTION

Figure 1:
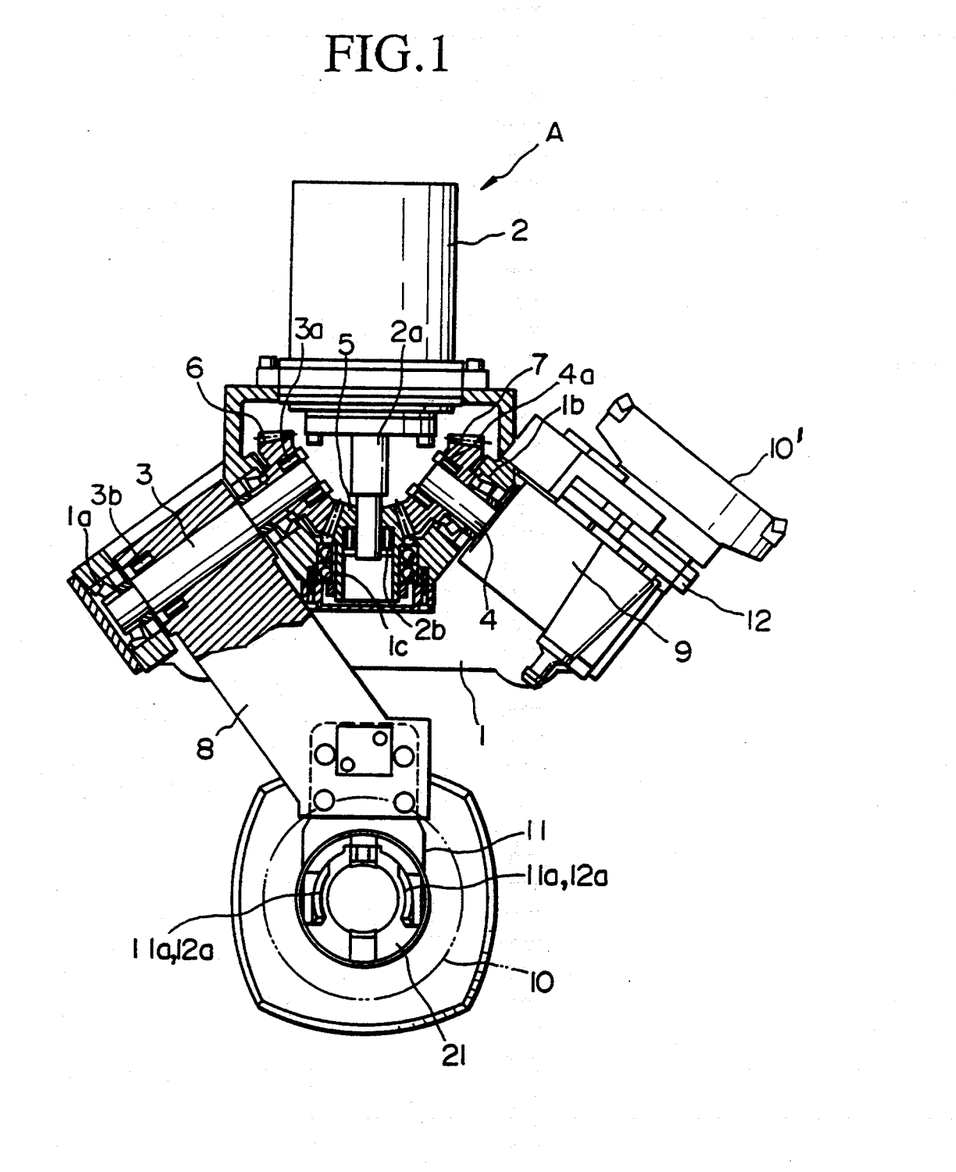
FIG. 1 presents a fragmented front view of the main parts of an embodiment of the device of the present invention for automatically exchanging tool bits.
Figure 2:
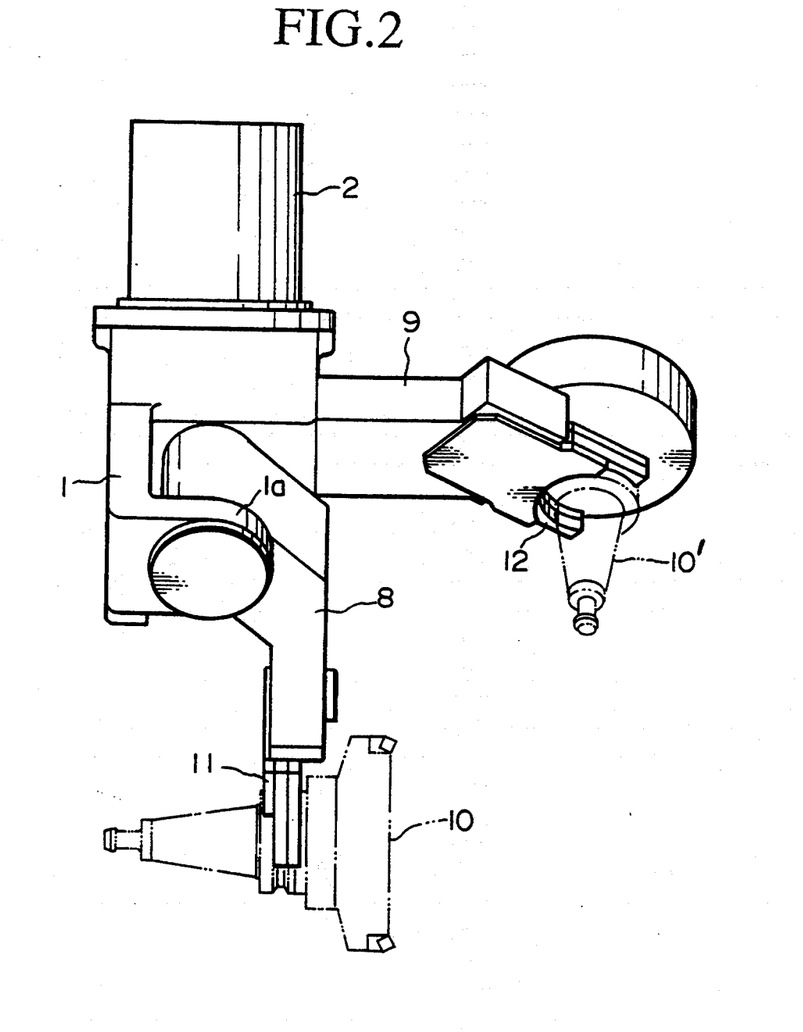
FIG. 2 is a perspective view of the embodiment seen from the left towards the right in FIG. 1.
Figure 3:
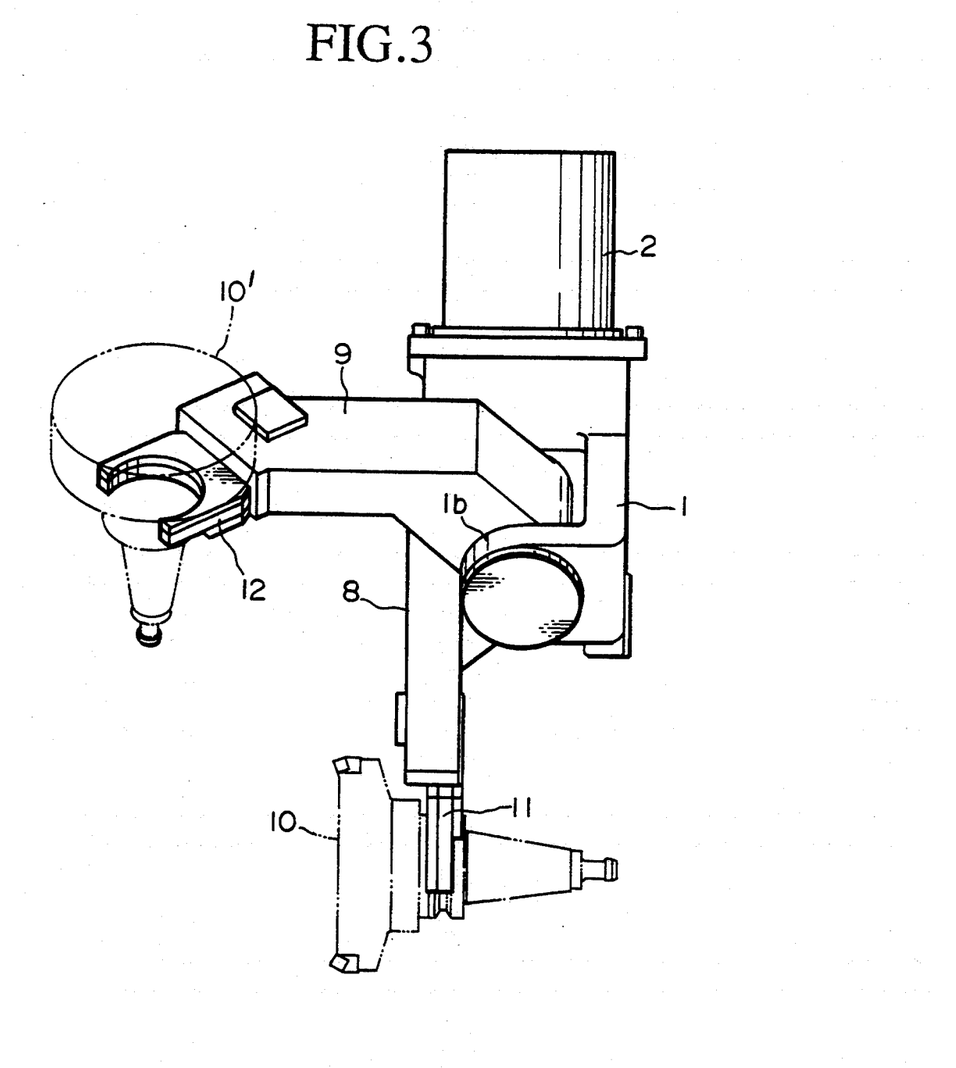
FIG. 3 is a perspective view of the embodiment seen from the right towards the left in FIG. 1.
Figure 4:
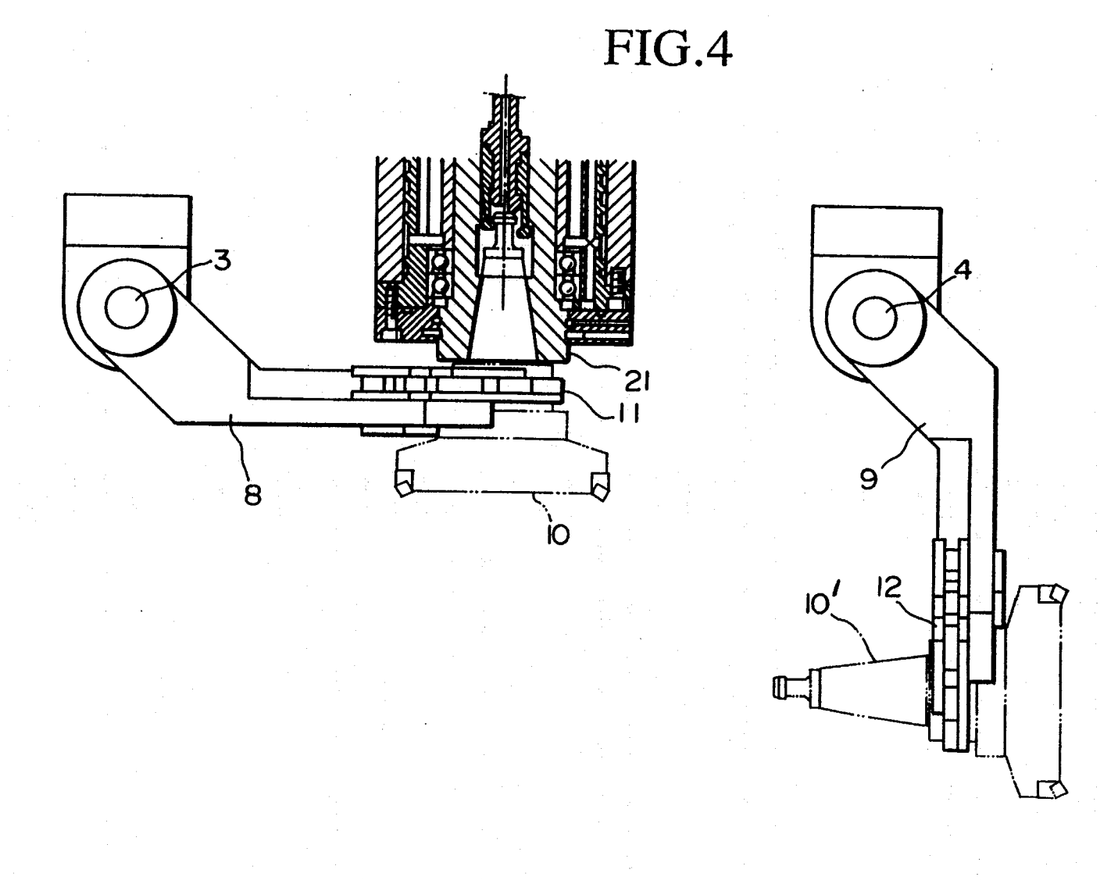
FIG. 4 is a side view showing the positional relationship between the spindle and a pair of rotating arms.

An embodiment of the present invention will be explained with reference to FIGS. 1 to 4. A tool exchanger device A in FIG. 1 is a device for automatically exchanging tool bits, and comprises a support frame 1 and a driving mechanism 2 firmly fixed on the support frame 1 as well as the rotating shafts 3, 4 supported by the bearings 1a, 1b. The driving mechanism 2 comprises electric and hydraulic motors, and associated actuators. A bevel gear 5 having a bearing 1c is attached to the bottom end of an output shaft 2a by a fixing device 2b.

The pair of rotating shafts 3, 4 are disposed symmetrically on the left and right sides of the output shaft 2a, and the extension lines from the centers of the rotating shafts 3, 4 cross each other at the extension line of the center line of the output shaft 2a at the base of the output shaft 2a of the bevel gear 5. Above the upper end of the rotating shafts 3, 4, there are follower bevel gears 6, 7, which are supported by the fixing devices 3a, 4a and engaged with the bevel gear 5.

Swing arms 8, 9 having a 90 degree separation angle are fixed to the rotating shaft 3, 4 respectively by fixing devices 3b, 4b (4b is not shown). Each swing arm 8, 9 is respectively provided with a set of gripper device 11, 12 at its free end for grasping a tool 10. The swing arms 8, 9 with the gripper devices 11, 12 are disposed symmetrically, and are driven by the driving device 2. The motions of the swing arms 8, 9 are as follows: they rotate 90 degrees simultaneously within a plane about the spindle 21 of a machining center B; resulting in that one of the swing arm 8 removes the gripper devices 11 from the operating position (the position of the swing arm 8 in FIG. 1) to a ready position (the position of the swing arm 9 in FIG. 1) at the same time as the swing arm 9 moves the gripper device 12 from the stand-by position to the operating position. The designs of the gripper devices 11, 12 are known, as are the hooks 11a, 12a which elastically hold the tool 10.

Figure 5:
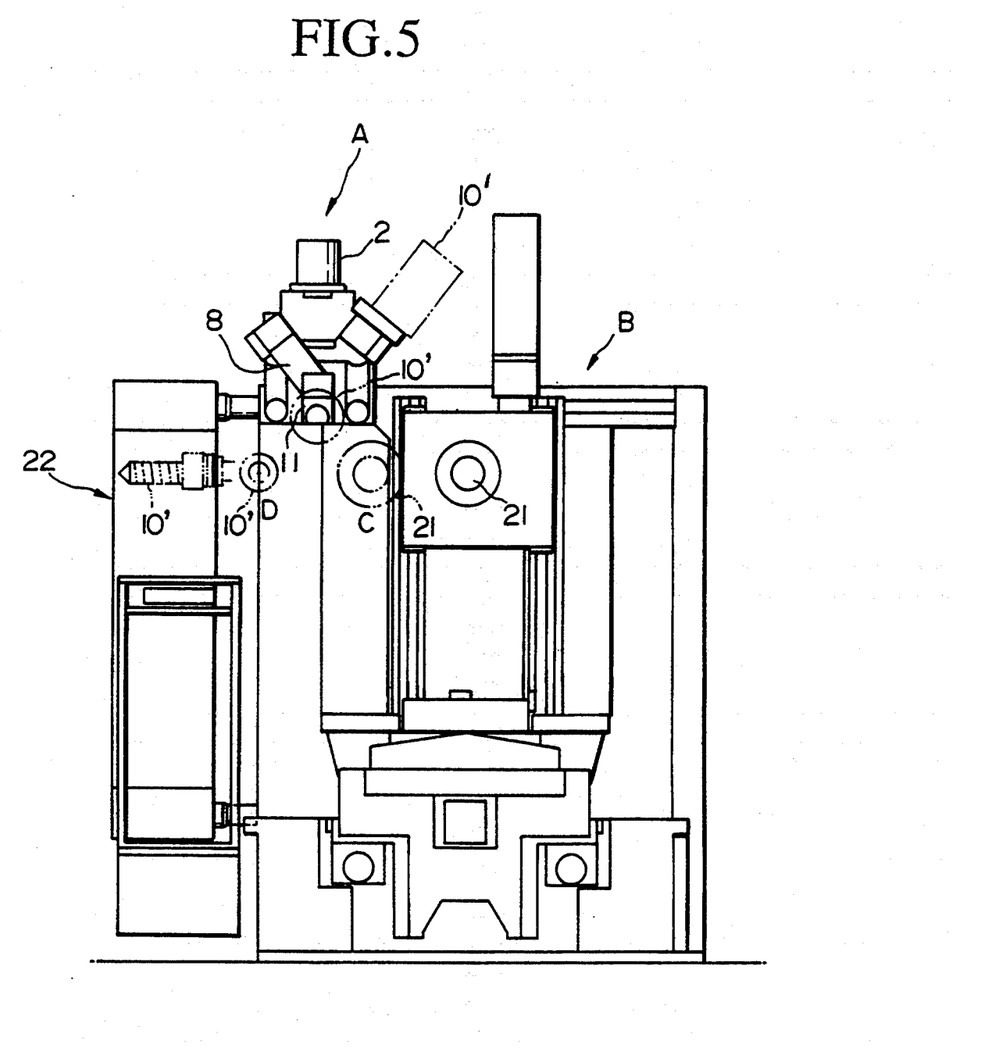
FIG. 5 is a schematic illustration of the device of the present invention installed on a machining center.
Figure 6:
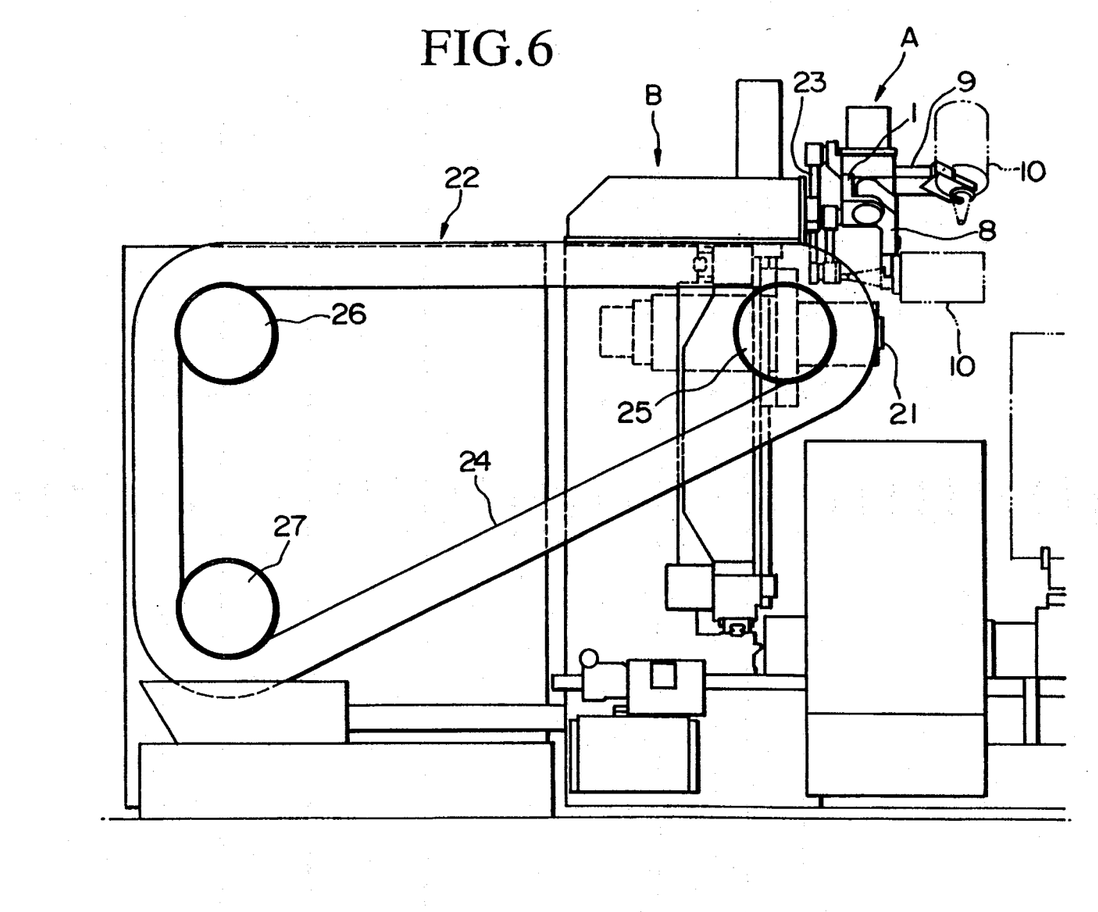
FIG. 6 is a side view of the machining center shown in FIG. 5.

The tool exchanger device A of the above configuration is disposed between a spindle 21 of a machining center B and a tool magazine 22, as shown in FIGS. 5 and 6. The support frame 1 is attached to a guide rod 23, as shown in FIG. 6, and in freely movable in the directions of X- and Y-axis. The spindle 21 is freely movable in the directions of the X-, Y- and Z-axis. The X-axis direction is left/right, the Y-axis direction is up/down and the Z-axis direction is at right angles to the plane of the paper in FIG. 5.

The tool magazine 22 shown in FIG. 6 comprises an endless chain 24 having a plurality of links provided with tool pot (not shown), driven by pulleys 25, 26 and 27. Each of the tool pots in the tool magazine 22 holds the new tool 10' in the X-axis direction. The tool magazine 22 also rotates the tool pots, which serve as the shell for the shank part of tool 10', 90 degrees in the horizontal direction so as to orient the tool axis in the Z-axis direction at the pulley 25. This is shown at D in FIG. 5. The machining center B is a known conventional type.

The operation of the tool exchanger device A of the present invention will be explained in the following.

A tool 10 (new or used) is installed on the gripper devices 11 of the swing arm 8 or the gripper device 12 of the swing arms 9 by the following steps. Referring to FIG. 5, the device A is moved in the X-axis direction from the stand-by position relative to the spindle 21 or the tool magazine 22. Either the gripper devices 11 of the swing arm 8 or the gripper device 12 of the swing arm 9 is disposed directly above the spindle 21 which has been moved to the first exchange position C, or above the tool 10', on the second exchange position D, taken out from the tool magazine 22 and disposed so that its shaft lies parallel to the spindle shaft 21 The device A is then lowered relative to the spindle 21 or to the tool 10 of the tool magazine 22. The tool 10 of the tool magazine 22 to be held in the gripper devices 11,12 has been oriented in the Z-axis direction by the rotation of the tool pot of the endless chain 24.

When the tool 10 (new or used) is to be removed from the gripper devices 11, 12, the tool changer is raised vertically relative to the spindle 21 or the tool magazine 22 when the tool bits 10 held in the gripper devices 11, 12 are attached to the spindle 21 or to the tool magazine 22.

When the tool 10 (new or used) is to be exchanged between the spindle 21 and the tool magazine 22, a new tool 10' in the tool magazine 22, oriented in the Z-axis direction is first held in one of the gripper devices 11, 12 for example, the gripper device 12 of swing arm 9 swung downwards, and then the driving device 2 is operated. The operation of the driving device 2 makes the swing arm 9, having the new tool 10' in its gripper device 12, swing upwards, thereby removing the new tool 10' from the tool magazine 22 and assumes a horizontal position. The swing arm 8, having an empty gripper device 11, rotates downwards at the same time as the swing arm 9 rotates upwards.

Next, the tool changer is first raised upwards, and then the device A is moved in the X-axis direction to dispose the empty gripper device 11 of the swing arm 8 to a location above the spindle 21. The device A is then lowered to grip the used tool 10 disposed in the spindle 21 in the gripper device 11. This condition is illustrated in FIG. 1.

The driving device 2 is now driven in the reverse direction to the above preparatory step. By this action, the swing arm 8 is rotated upwards, thereby removing the used tool 10 from the spindle 21 and assumes a horizontal position. At the same time the other swing arm 9 rotates downward as the swing arm 8 is moving upwards, and installs a new tool 10' in the now vacated spindle 21. After this step, the tool exchanger device A is raised upwards away from the spindle 21 to remove the gripper device 11 from the new tool 10'. The machining center B is now ready to perform a machining operation using the new tool 10'. By following the similar steps, the used tool 10 disposed on the swing arm 8 is returned to the tool magazine 22, thereby completing the exchange operation.

In the above descriptions, it is understood that the sequence of operations taken by the spindle 21 and the tool magazine 22 are general in nature, and other sequences are possible depending on the type of tool magazine and other details of the equipment. In the embodiment illustrated, each tool bit is identified by the chain numbers of the tool magazine, and tool management is facilitated. The tool pots are random with respect to the tool bits and the chain, and this arrangement is useful in shortening the preparation time for readying the next tool.

The above embodiment is a case of driving two swing arms 8, 9 at the same speed with one driving device 2, and mechanical interference between the two swing arms 8, 9 is avoided by positioning them suitably. It is also possible to avoid interferences by delaying the starting times for one swing arm relative to the other swing arm, by altering the speeds of the swing arms. Therefore, it is possible to avoid mechanical interferences by using the positional elements as well as chronological elements. However, as long as even a part of the operation of the swing arms 8, 9 is duplicated, such duplication times can be shortened, therefore, the meaning of simultaneous rotation, or rotating at the same time, includes the cases in which the rotations of the swing arms 8, 9 partly overlap each other.

It is also possible to use two driving devices 2 to drive the swing arms 8, 9 individually. In changing the rotation initiation times or rotation speeds, arrangements other than the bevel gear arrangement may be used, but the control operation is easier with two driving devices.

What is claimed is:

1. An automatic tool exchanger comprising:
   a support frame;
   a driving bevel gear, freely rotatably supported on said support frame;
   a driving means having an output shaft engaged to said driving bevel gear for rotating said driving bevel gear;
   a pair of follower bevel gears disposed on both sides of said bevel gear and engaged with said driving bevel gear;
   a pair of rotating shafts, having an internal part thereof integrally attached to each follower bevel gear, freely rotatably disposed on said support frame on both sides of said output shaft so that a central axis of each of said pair of rotating shafts crosses on a point lying on a line extending from a central axis of said output shaft;
   a pair of swing arms comprising one swing arm having one gripper disposed on its terminal part and other swing arm having other gripper disposed on its terminal end, and the opposite end of said each swing arm is fixed to an outer end of each of said rotating shafts with a phase separation angle arranged in the direction of rotation;
   wherein said driving means drives each rotating shaft to swing said pair of swing arms simultaneously in one common direction along a respective arc track lying on mutually intersecting planes, thereby causing one gripper of said one swing arm to remove a used tool from a spindle of a machine while simultaneously causing said other gripper of said other swing arm to insert a new tool in said spindle vacated by said used tool.

2. An automatic tool exchanger as claimed in claim 1, wherein said driving means comprise rotational means including an electric motor and/or a hydraulic motor, and an output shaft of said driving means is operatively attached to said driving bevel gear.

3. An automatic tool exchanger as claimed in claim 1, wherein said pair of rotating shafts are disposed symmetrically on both sides of said output shaft, said pair of follower bevel gears being provided with the same number of teeth, and said pair of swing arms rotate at the same rotational speed.

4. An automatic tool exchanger as claimed in claim 1, wherein said one swing arm and said other swing arm are fixed on each said opposite end of said rotating shafts with a 90° phase separation angle.

5. An automatic tool exchanger as claimed in claim 2, wherein said support frame has a box shaped portion, within which are housed said driving bevel gears and said pair of follower bevel gears, wherein said outer part of said rotating shafts are protruding out of said box shaped portion of said support frame.

6. An automatic tool exchanger as claimed in claim 5, wherein said driving bevel gear is freely rotatably supported on a central bottom part of said boxed shaped portion; a driving source for said driving means is disposed on a top part of said box shaped portion; said pair of rotating shafts whose center lines cross at a location above said driving bevel gear are freely rotatably supported on said bottom part of said box shaped portion; said pair of follower bevel gears engaged on both sides of said driving bevel gears are fixed to an interior part invading into said box shaped portion; and said swing arms are fixed to an outer part of each of said rotating shafts which are protruding out of the bottom part of said box shaped portion towards an outer direction.

7. An automatic tool exchanger as claimed in claim 6, wherein said support frame is provided with a pair of support arms on the outer terminal end of said rotating shafts, and said support arms freely rotatably support an outer part of each of rotating shaft.

8. An automatic tool exchanger as claimed in claim 6, wherein said pair of swing arms are fixed respectively to said rotating shafts at a 90° phase separation angle so that when said one swing arm is positioned vertically down with respect to said support frame, said other swing arm is positioned horizontally up in front of said support frame.

9. A method for automatically exchanging a tool between a tool magazine and a spindle of a machine using an automatic tool exchanger comprising a support frame; a driving bevel gear; a driving means operatively attached to said driving bevel gear; a pair of follower bevel gears engaged with said driving bevel gear; a pair of rotating shafts integrally fixed to said follower bevel gears, and freely rotatably disposed on said support frame on both sides of said output shaft; a pair of swing arms comprising one swing arm having one gripper and other swing arm having other gripper, disposed on a distal end of each of said swing arms which are fixed to an outer end of each of said rotating shafts so as to provide a phase separation angle which is phase shifted in the direction of rotation; wherein
   when said one gripper and other gripper are both empty, said method comprising the steps of:
   (a) moving said automatic tool exchanger from a ready position to a first exchange position through vertical and horizontal movements towards said tool magazine, and with a grip opening facing downward and empty, inserting said one gripper onto a new tool lying in the direction of said spindle on said tool magazine, and holding said new tool in said one gripper;
   (b) swinging said pair of swing arms and removing said new tool from said tool magazine by swinging said one gripper up along one arc track while simultaneously swinging said other gripper down alone other arc track and positioning said other gripper with a grip opening downward facing a vacated tool pot of said tool magazine;
   (c) moving said automatic tool exchanger from said first exchange position to a second exchange position through vertical and horizontal movements towards said machine so as to insert said other gripper onto a used tool disposed in said spindle and holding said used tool in said other gripper;
   (d) swinging said pair of swing arms and removing said used tool disposed in said spindle by swinging said other gripper up along said other arc track while simultaneously swinging down along said one arc track of said one gripper holding said new tool and inserting said new tool in said spindle; and
   (e) moving said automatic tool exchanger up and disengaging said one gripper from said new tool, and returning said automatic tool exchanger with the gripper opening of said one gripper facing downward and empty to said ready position located between said first tool exchange position and said second tool exchange position.

10. A method as claimed in claim 9, further comprising the steps of:
   (f) moving said automatic tool exchanger down from said ready position to said first exchange position towards said tool magazine, and inserting said one gripper onto a new tool lying in the direction of said spindle on said tool magazine, and holding said new tool in said one gripper which has been vacated;
   (g) swinging said pair of swing arms so as to remove said new tool from said tool magazine by swinging said one gripper up along said one arc track while simultaneously swinging down along said other arc track of said other gripper holding said used tool to face an empty tool pot of said tool magazine, and returning said used tool in said empty tool pot;
   (h) moving said automatic tool exchanger up vertically away from said used tool to disengage said other gripper empty and facing downward from said used tool, and returning said automatic tool exchanger to said ready position.

11. A method as claimed in claim 9, wherein in step (b), said other gripper holds a used tool which had been removed from said spindle, and by the downward movement of said other gripper, said other gripper returns said used tool in a tool pot of said tool magazine so that said used tool will lay in said tool pot in the direction of said spindle.

12. A method for automatically exchanging a tool between a tool magazine and a spindle of a machine using an automatic tool exchanger, comprising a support frame; a driving bevel gear; a driving means operatively attached to said driving bevel gear; a pair of follower bevel gears engaged with said driving bevel gear; a pair of rotating shafts integrally fixed to said follower bevel gears, and freely rotatably disposed on said support frame on both sides of said output shaft; a pair of swing arms comprising one swing arm having one gripper and other swing arm having other gripper, disposed on a distal end of each of said swing arms which are fixed to an outer end of each of said rotating shafts so as to provide a phase separation angle which is phase shifted in the direction of rotation; wherein
   when said one gripper has a new tool and said other gripper is empty, said method comprising the steps of:
   (a) moving said automatic tool exchanger from a ready position downward towards said spindle of said machine to a second exchange position, and inserting said other gripper onto a used tool disposed in said spindle and holding said used tool in said other gripper;
   (b) swinging said pair of swing arms and removing said used tool from said spindle by swinging said other gripper up along other arc track while simultaneously swinging said one gripper down along one arc track and inserting said new tool in said spindle which has been vacated;
   (c) moving said automatic tool exchanger from said second exchange position through vertical and horizontal movements to a first exchange position towards said tool magazine, and inserting said one gripper on a new tool disposed in said tool magazine lying in the direction of said spindle, and holding said new tool in said one gripper which has been vacated;
   (d) swinging said pair of swing arms up and removing said new tool from said tool magazine by swinging said one gripper up along said one arc track while simultaneously swinging down other gripper along said other arc track and returning said used tool in a tool part of said tool magazine; and
   (e) moving said automatic tool exchanger up and horizontally towards said machine and returning said automatic tool exchanger in said ready position located between said first tool exchange position and said second tool exchange position.

13. A method as claimed in claim 9, wherein said tool magazine stores a plurality of tools at right angles to said spindle, and transfers a selected tool to said first tool exchange position by periodically swinging a tool pot holding said selected tool, when said tool pot holds said selected tool with its axis lying parallel to said spindle.

14. A method as claimed in claim 10, wherein said tool magazine stores a plurality of tools at right angles to said spindle, and transfers a selected tool to said first tool exchange position by periodically swinging a tool pot holding said selected tool, when said tool pot holds said selected tool with its axis lying parallel to said spindle.

15. A method as claimed in claim 11, wherein said tool magazine stores a plurality of tools at right angles to said spindle, and transfers a selected tool to said first tool exchange position by periodically swinging a tool pot holding said selected tool, when said selected tool pot holds said selected tool with its axis lying parallel to said spindle.

16. A method as claimed in claim 12, wherein said tool magazine stores a plurality of tools at right angles to said spindle, and transfers a selected tool to said first tool exchange position by periodically swinging a tool pot holding said selected tool, when said selected tool pot holds said selected tool with its axis lying parallel to said spindle.

* * * * *